United States Patent
Akelbein et al.

(10) Patent No.: US 8,024,354 B2
(45) Date of Patent: Sep. 20, 2011

(54) SYSTEM AND METHOD FOR MANAGING DATA USING A HIERARCHICAL METADATA MANAGEMENT SYSTEM

(75) Inventors: Jens-Peter Akelbein, Bodenheim (DE); Nils Haustein, Soergenloch (DE)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 12/164,197

(22) Filed: Jun. 30, 2008

(65) Prior Publication Data

US 2009/0327340 A1    Dec. 31, 2009

(51) Int. Cl.
*G06F 17/30* (2006.01)
(52) U.S. Cl. ....................................... 707/778
(58) Field of Classification Search ............... 707/778
See application file for complete search history.

(56) References Cited

U.S. PATENT DOCUMENTS

| | | | |
|---|---|---|---|
| 2006/0259527 A1* | 11/2006 | Devarakonda et al. | 707/203 |
| 2009/0043978 A1* | 2/2009 | Sawdon et al. | 711/162 |

* cited by examiner

*Primary Examiner* — Charles Rones
*Assistant Examiner* — Mellissa M Chojnacki
(74) *Attorney, Agent, or Firm* — Schmeiser, Olsen & Watts; Randall J. Bluestone

(57) ABSTRACT

A system and associated method for managing data. Each pointer of at least one pointer is stored in a metadata object. The pointer resides in a first repository, each unique file resides in a second repository, and the metadata object resides in third repository. Each pointer is deleted from the first repository. Upon receipt from the first repository of an event indicating both a unique file and a pointer no longer resides in the first repository, the pointer is searched for in each metadata object residing in the third repository pertaining to a hierarchical metadata management system (HMMS). After searching and locating the pointer in a metadata object in the third repository, the pointer is restored to the first repository. A hierarchical storage management system (HSM) is notified that the pointer currently resides in the first repository thus allowing the HSM to retrieve the unique file from the second repository.

20 Claims, 4 Drawing Sheets

SYSTEM AND METHOD FOR MANAGING DATA USING A HIERARCHICAL METADATA MANAGEMENT SYSTEM

BACKGROUND OF THE INVENTION

The present invention relates generally to hierarchical management systems and more particularly to reducing the overhead associated with maintaining hierarchical management systems.

Conventional hierarchical storage management (HSM) systems manage objects residing in an online-accessible repository as well as an offline repository. Reasons for moving objects from the online-accessible repository to the offline repository may be, inter alia, the object is out of date, the object is currently of limited value, there is a finite amount of space in the online-accessible repository, etc. However, there usually is a chance the moved object will be requested at least once in the future. Therefore, a pointer is placed in the online-accessible repository pointing to the moved object residing in the offline repository. The pointer allows for access to the object without storing said object in the finite space of the online-accessible repository.

Due to the ever-increasing production of data, the number of objects stored in an online accessible repository such as a file systems also grows. While one million files were rarely seen on file systems merely ten (10) years ago, today HSM systems manage tens of millions of files with a trend towards billions of files. As a result current HSM systems require an ever increasing number of pointers to accommodate the influx of data.

SUMMARY OF THE INVENTION

In view of the foregoing and other exemplary problems, drawbacks, and disadvantages of the conventional systems and methods, the present invention provides a method for managing data using a hierarchical metadata management system (HMMS), the method comprising:

storing each pointer of at least one pointer in a metadata object wherein said metadata object corresponds to an attribute being exhibited by a unique file to which each said pointer corresponds, each said pointer residing in a first repository, each said unique file residing in a second repository, each said metadata object residing in third repository, said storing being performed by said HMMS;

after said storing, deleting each said pointer from said first repository, said deleting being performed by said HMMS;

receiving from said first repository an event indicating both a unique file and a pointer corresponding to said unique file no longer resides in said first repository, said event being generated by said first repository in response to a request for said unique file, said event being received by said HMMS;

after said receiving, searching for said pointer in each said metadata object residing in said third repository, said searching being performed by said HMMS;

after said searching and having located said pointer in a metadata object residing in said third repository, restoring said pointer to said first repository, said restoring being performed by said HMMS; and after said restoring, notifying a hierarchical storage management system (HSM) that said pointer currently resides in said first repository thus allowing said HSM to retrieve said unique file corresponding to said pointer from said second repository.

DETAILED DESCRIPTION OF THE DRAWINGS

Although certain embodiments of the present invention are described herein, it is understood modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
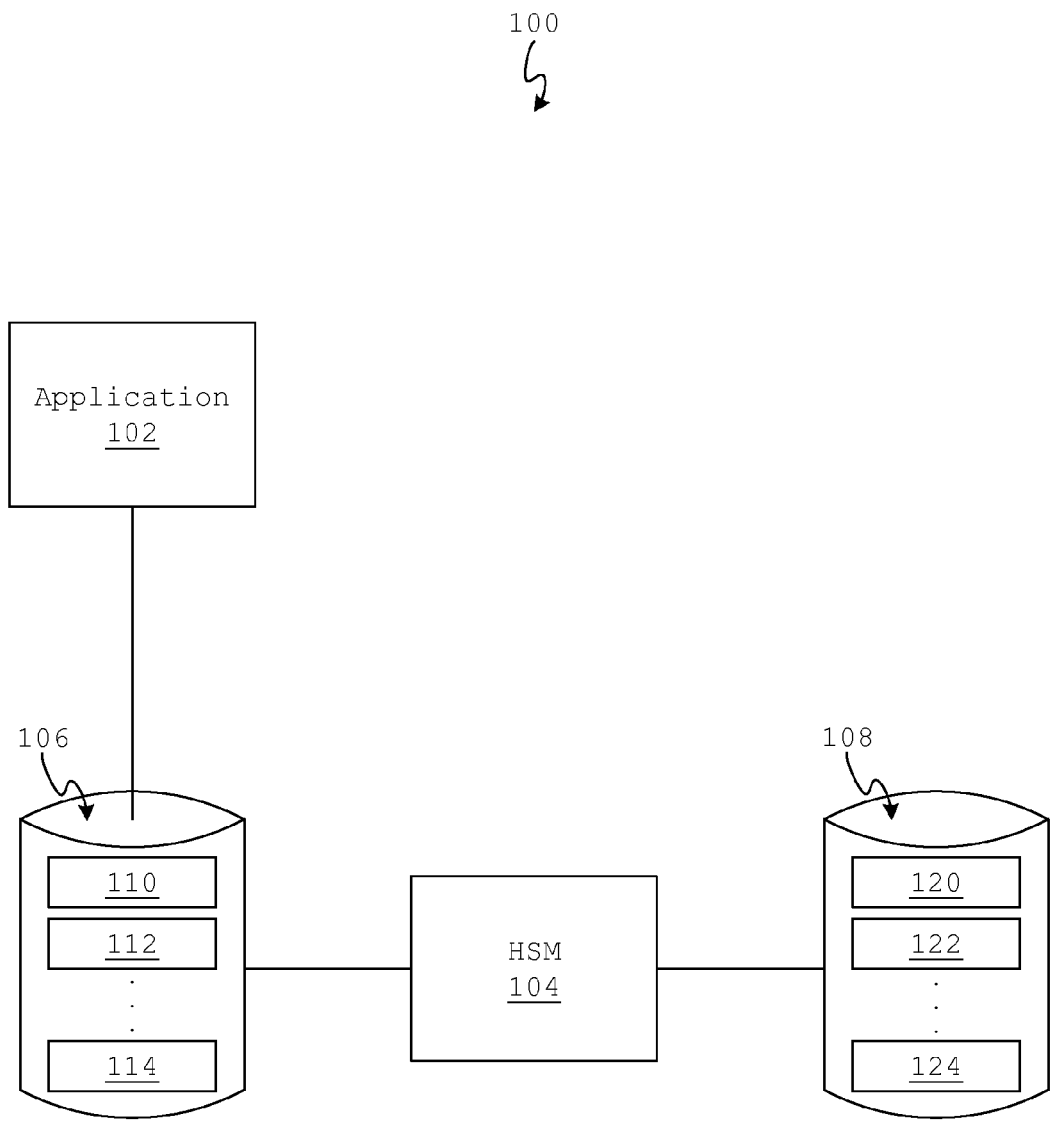
FIG. 1 illustrates a conventional hierarchical management storage system used for managing data.

FIG. 1 illustrates a conventional hierarchical management storage system (HSM) 100 used for managing data. The system 100 comprises an application 102, a hierarchical storage manager 104, an online repository 106, and an offline repository 108. The online repository further comprises a combination of files and pointers to files, 110 through 114. The offline repository further comprises files 120 through 124.

The application 102 may add, delete, and/or modify the files 110 residing in the online repository 106. Due to the finite space of the online repository 106, the HSM 104 must move files from the online repository 106 to the offline repository 108, and vice versa. When the HSM 104 moves a file from the online repository 106 to the offline repository 108, it leaves a pointer 112 to the file on the online repository 106. Similarly, when the HSM 104 restores a file from the offline repository 108 to the online repository 106, it removes the pointer 112 from the online repository 106 and replaces it by said restored file.

Unfortunately, as the number of files the application 102 creates increases so too does the number of pointers located in the online repository 106. For large file systems, there is a need to more efficiently manage online and offline data storage.

Figure 2:
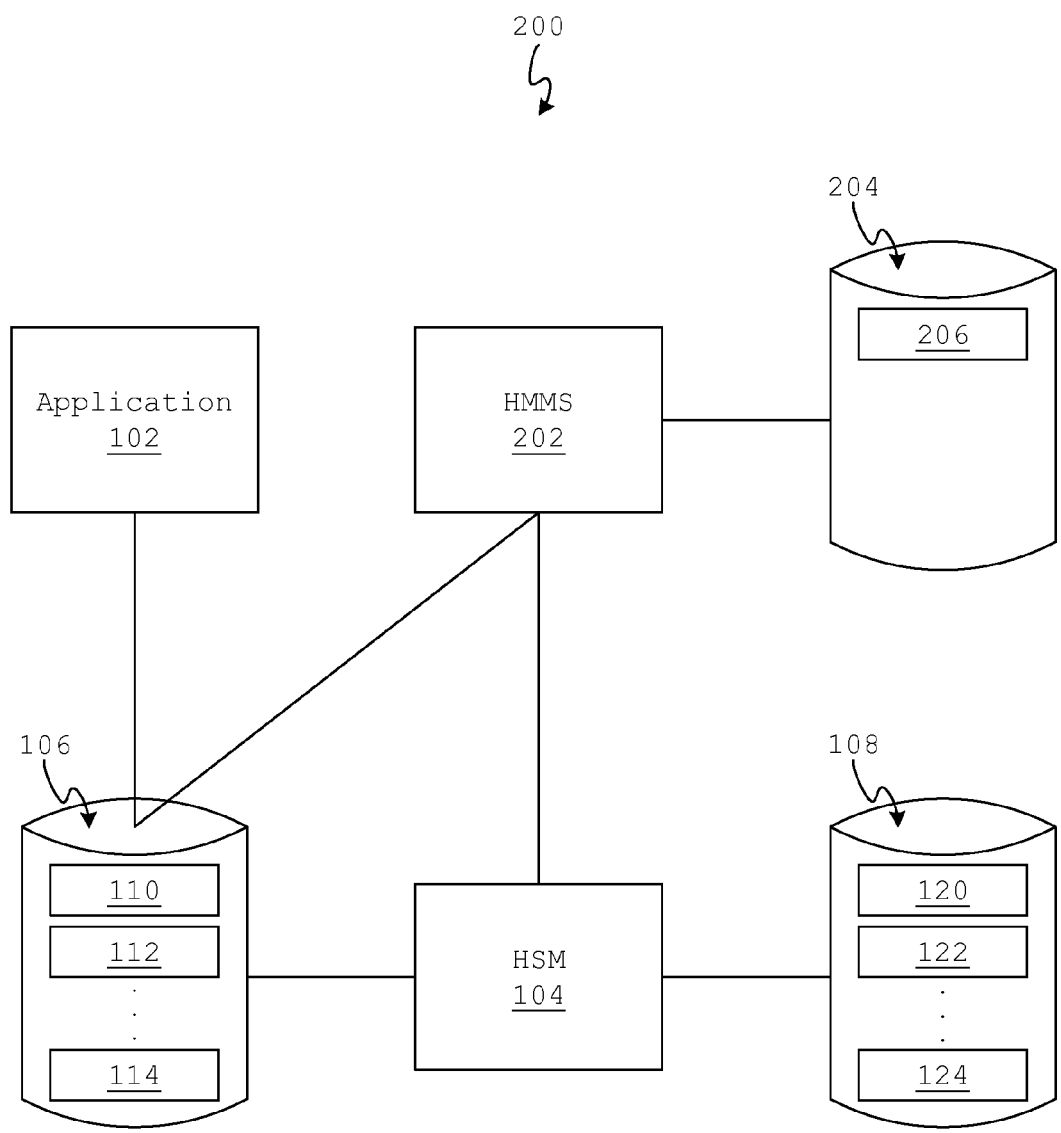
FIG. 2 illustrates a hierarchical metadata management system used for managing data, in accordance with embodiments of the present invention.

FIG. 2 illustrates a hierarchical metadata management system (HMMS) 200 used for managing data, in accordance with embodiments of the present invention. The system 200 comprises an application 102, a hierarchical storage manager 104, an online repository 106, an offline repository 108, as well as an HMMS 202, and an HMMS repository 204. The online repository further comprises a combination of files and pointers to files, 110 through 114. The offline repository further comprises files 120 through 124. Finally, the HMMS repository 204 comprises a list of pointers 206. The HMMS 202 is connected to the online repository 106 as well to the HSM 204. This connection might be realized through connections and protocols according to prior art, such as an Ethernet connection running the TCPIP protocol. The connection to the online repository 106 allows the HMMS to intercept file system actions, for example by utilizing the prior art Data Management Application Programming Interface (DMAPI) which is supported by various file systems. Incepting file system actions and errors means that when the application 102 accesses a pointer in the online repository 106 the HMMS is being informed about this access request and can act upon it as detailed later.

The application 102 reads and writes files (e.g. file 110) to online repository 106 via a file system interface such as NFS, CIFS or JFS. In one embodiment of the present invention, the HSM 112 contains policies to migrate files from the online repository 106 to the offline repository 108. The HSM 104 thereby leaves a pointer 112 in the online repository 106. Pointer 112 may point to file 122 residing in the offline repository 108. Whenever the HSM 104 migrates a file to the offline repository 108 it informs the HMMS 202 about the new pointer 112.

In one embodiment of the present invention, the HMMS 202 groups pointer 112 (and other pointers) in a metadata object 206 residing in the HMMS repository 204. Thereby the HMMS adds the pointer information for pointer 112 to the metadata object 206. Subsequently the HMMS deletes pointer 112 from online repository 106. This decreases the number of pointers in the online repository 106 because now multiple pointers such as 112 are grouped in metadata object 206 and deleted from the online repository.

Conventionally, pointers include the file name and meta information—such as owner name, access control list, date and time of creation and modification—required for the HSM 104 to recall the correct file from the offline repository 108. This pointer information becomes part of the metadata object 206 residing in the HMMS repository 206. Thus the file 122 which has pointer 112 is now referenced by metadata object 206 stored in the HMMS repository 204. Additionally HMMS intercepts file system actions and errors to act upon access attempts of an application to pointer 112.

Grouping pointers into a single metadata object 206 is based on policies established by the HMMS 202. In one embodiment of the present invention, all pointers in a given directory are grouped in one metadata object 206 periodically; the directory name and period length being customizable.

In another embodiment of the present invention, grouping pointers residing in the online repository 106 is based on capacity of said online repository 106. For example, an end user can establish a maximum number of pointers allowed in the online repository 106. If the number of pointers residing in the online repository 106 exceeds said maximum number, a subset of all pointers is grouped into a metadata object 206 and subsequently deleted from the online repository 106 until the total number of pointers is lower than the maximum number. Pointers which have not been used for the longest time are grouped first.

In yet another embodiment of the present invention, the grouping of pointers residing in the online repository is based on Information Lifecycle Management (ILM) policies. Thereby pointers for certain file types are grouped together into a single metadata object 206.

When the application 102 opens file 122 which had pointer 112 and which is now grouped in HMMS metadata object 206, the file open request (file system function call) is intercepted by the HMMS 202. The interception is triggered by a file system error when trying to open file which does not exist—because the associated pointer is grouped—and it is based on DMAPI functions according to prior art allowing to inform the HMMS about this error. The error information includes the name of the file which the application wanted to open. Subsequently the HMMS 202 executes a method 300 (see FIG. 3, infra) to restore the pointer 112 to the online repository 106.

Figure 3:
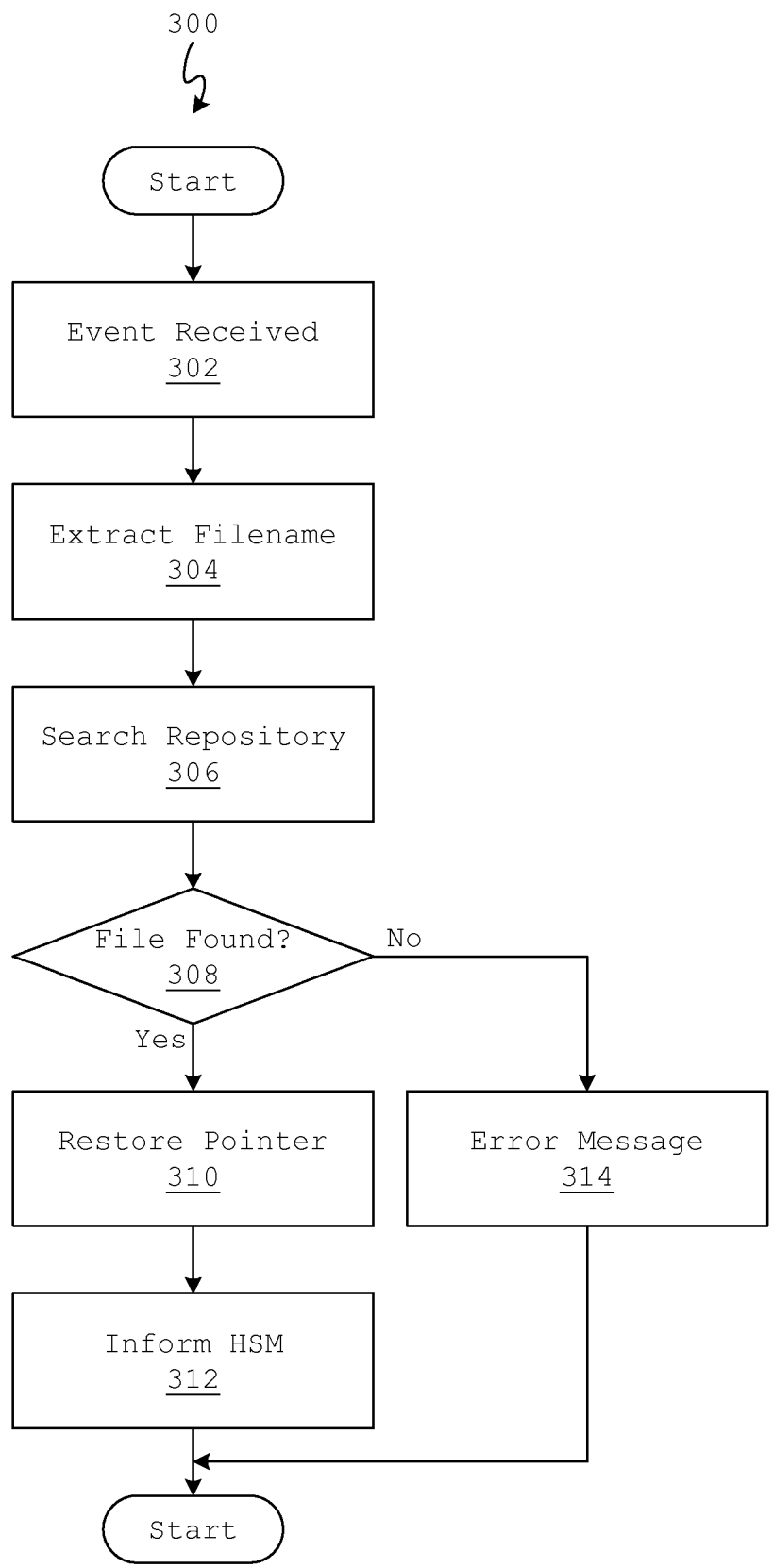
FIG. 3 illustrates a method for implementing a hierarchical metadata management system in order to manage data, in accordance with embodiments of the present invention.

FIG. 3 illustrates a method 300 for implementing a hierarchical metadata management system 200 (see FIG. 2, supra) in order to access data, in accordance with embodiments of the present invention. The method 300 begins with step 302 which receives and event.

Step 302 receives an event—such as a file system error—indicating that a file 110 (see FIG. 2, supra) or pointer 112 (see FIG. 2, supra) no longer resides in the online repository 106 (see FIG. 2, supra). In response to receiving the event 302, the method 300 continues with step 304 which extracts the filename.

Step 304 extracts the filename from the request submitted by the application 102 and received by the HMMS 202. After completion of step 304, the method 300 continues with step 306 which searches the HMMS repository 206 (see FIG. 2, supra) for the file.

Step 306 searches the HMMS repository 206 for the file associated with the filename extracted in step 304. More specifically, the he search performed in step 306 searches all metadata objects 206 located in the HMMS repository 204 in order to obtain the pointer 112 (see FIG. 2, supra). After completion of step 306, the method 300 continues with step 308 which determines if the file pointer was found in the HMMS repository 204.

Step 308 determines whether the file pointer 112 was found in the HMMS repository 204. If step 308 locates the file pointer in a metadata object 206 located in the HMMS repository 204, the method 300 continues with step 310 which restores the pointer 112 to the online repository 106. However, if the file pointer 112 is not found in the metadata objects 206 located in the HMMS repository 204, the method 300 continues with step 314 which submits an error message to the application 102.

If method 300 continues with step 310 which restores the pointer to the online repository 106; the file pointer 112 matching the file name requested by the application is read from the metadata object 206 and written to the online repository 106 by the HMMS 202. After restoring the pointer in step 310, the method 300 continues with step 312 which notifies the HSM 104 of the restored pointer 112.

Step 312 informs the HSM 104 that the pointer 112 was restored to and currently resides in the online repository 106. The HSM therein utilizes the pointer 112 to retrieve the file 212 located in the offline repository 108 said pointer 112 points to utilizing methods according to prior art. After completion of step 312, the method 300 returns to the beginning of the method and awaits a subsequent event 302.

If method 300 continues with step 314 which produces an error message; the application 102 is notified by said error message that the file requested does not exist in the online repository 106 or the offline repository 108. After completion of step 314, the method 300 returns to the beginning of the method and awaits a subsequent event 302.

Figure 4:
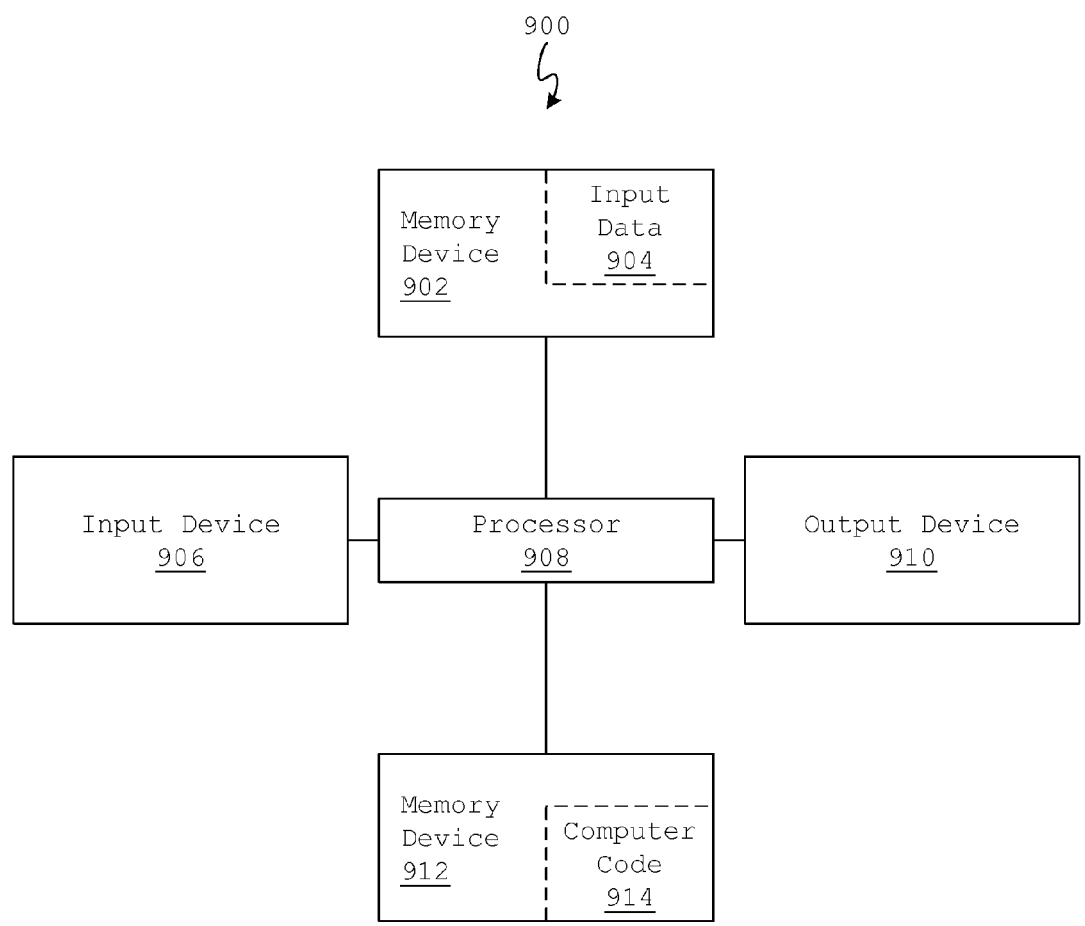
FIG. 4 illustrates a computer system which may facilitate a method for managing data using a hierarchical metadata management system, in accordance with embodiments of the present invention.

FIG. 4 illustrates a computer system 900 which may facilitate a method for managing data using a hierarchical metadata management system, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for managing data using a hierarchical metadata management system according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 3) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for managing data using a hierarchical metadata management system. Thus, the present invention discloses a process for supporting computer infrastructure, comprising integrating, hosting, maintaining and deploying computer-readable code into a computing system (e.g., computing system 900), wherein the code in combination with the computing system is capable of performing a method for managing data using a hierarchical metadata management system.

In another embodiment, the invention provides a business method that performs the process steps of the invention on a subscription, advertising and/or fee basis. That is, a service provider, such as a Solution Integrator, can offer to create, maintain, support, etc. a process for managing data using a hierarchical metadata management system. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 900 as a particular configuration of hardware and software, any configuration of hardware and software, as would be known to a person of ordinary skill in the art, may be utilized for the purposes stated supra in conjunction with the particular computer system 900 of FIG. 4. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for managing data using a hierarchical metadata management system (HMMS), the method comprising:
storing each pointer of at least one pointer in a metadata object wherein said metadata object corresponds to an attribute being exhibited by a unique file to which each said pointer corresponds, each said pointer residing in a first repository, each said unique file residing in a second repository, each said metadata object residing in third repository, said storing being performed by said HMMS;
after said storing, deleting each said pointer from said first repository, said deleting being performed by said HMMS;
receiving from said first repository an event indicating both a unique file and a pointer corresponding to said unique file no longer resides in said first repository, said event being generated by said first repository in response to a request for said unique file, said event being received by said HMMS;
after said receiving, searching for said pointer in each said metadata object residing in said third repository, said searching being performed by said HMMS;
after said searching and having located said pointer in a metadata object residing in said third repository, restoring said pointer to said first repository, said restoring being performed by said HMMS; and
after said restoring, notifying a hierarchical storage management system (HSM) that said pointer currently resides in said first repository thus allowing said HSM to retrieve said unique file corresponding to said pointer from said second repository.

2. The method of claim 1, said storing and said deleting both being performed by said HMMS cyclically and independently of said receiving from said first repository said event.

3. The method of claim 1, said storing and said deleting both being performed by said HMMS at least once before said receiving from said first repository said event.

4. The method of claim 1, said storing and said deleting both being performed by said HMMS after a total number of pointers residing in said first repository exceeds a threshold, said threshold being established by an end user.

5. The method of claim 1, said storing and said deleting both being performed by said HMMS in response to said HMMS receiving a request from an end user.

6. A computer program product, comprising a computer-usable storage device having a computer-readable program code stored therein, said computer-readable program code containing instructions that when executed by a processor of a computer system implement a method for managing data using a hierarchical metadata management system (HMMS), the method comprising:
storing each pointer of at least one pointer in a metadata object wherein said metadata object corresponds to an attribute being exhibited by a unique file to which each said pointer corresponds, each said pointer residing in a first repository, each said unique file residing in a second repository, each said metadata object residing in third repository, said storing being performed by said HMMS;
after said storing, deleting each said pointer from said first repository, said deleting being performed by said HMMS;
receiving from said first repository an event indicating both a unique file and a pointer corresponding to said unique file no longer resides in said first repository, said event being generated by said first repository in response to a request for said unique file, said event being received by said HMMS;

after said receiving, searching for said pointer in each said metadata object residing in said third repository, said searching being performed by said HMMS;

after said searching and having located said pointer in a metadata object residing in said third repository, restoring said pointer to said first repository, said restoring being performed by said HMMS; and after said restoring, notifying a hierarchical storage management system (HSM) that said pointer currently resides in said first repository thus allowing said HSM to retrieve said unique file corresponding to said pointer from said second repository.

7. The computer program product of claim 6, said storing and said deleting both being performed by said HMMS cyclically and independently of said receiving from said first repository said event.

8. The computer program product of claim 6, said storing and said deleting both being performed by said HMMS at least once before said receiving from said first repository said event.

9. The computer program product of claim 6, said storing and said deleting both being performed by said HMMS after a total number of pointers residing in said first repository exceeds a threshold, said threshold being established by an end user.

10. The computer program product of claim 6, said storing and said deleting both being performed by said HMMS in response to said HMMS receiving a request from an end user.

11. A computing system comprising a processor coupled to a computer-readable memory unit, said memory unit comprising a software application, said software application comprising instruction that when executed by said processor, implement a method for managing data using a hierarchical metadata management system (HMMS), the method comprising:

storing each pointer of at least one pointer in a metadata object wherein said metadata object corresponds to an attribute being exhibited by a unique file to which each said pointer corresponds, each said pointer residing in a first repository, each said unique file residing in a second repository, each said metadata object residing in third repository, said storing being performed by said HMMS;

after said storing, deleting each said pointer from said first repository, said deleting being performed by said HMMS;

receiving from said first repository an event indicating both a unique file and a pointer corresponding to said unique file no longer resides in said first repository, said event being generated by said first repository in response to a request for said unique file, said event being received by said HMMS;

after said receiving, searching for said pointer in each said metadata object residing in said third repository, said searching being performed by said HMMS;

after said searching and having located said pointer in a metadata object residing in said third repository, restoring said pointer to said first repository, said restoring being performed by said HMMS; and after said restoring, notifying a hierarchical storage management system (HSM) that said pointer currently resides in said first repository thus allowing said HSM to retrieve said unique file corresponding to said pointer from said second repository.

12. The computing system of claim 11, said storing and said deleting both being performed by said HMMS cyclically and independently of said receiving from said first repository said event.

13. The computing system of claim 11, said storing and said deleting both being performed by said HMMS at least once before said receiving from said first repository said event.

14. The computing system of claim 11, said storing and said deleting both being performed by said HMMS after a total number of pointers residing in said first repository exceeds a threshold, said threshold being established by an end user.

15. The computing system of claim 11, said storing and said deleting both being performed by said HMMS in response to said HMMS receiving a request from an end user.

16. A process for supporting computer infrastructure, said process comprising providing at least one support service for at least one of creating, integrating, hosting, maintaining, and deploying computer-readable code in a computing system, wherein said code in combination with the computing system is capable of implementing a method for managing data using a hierarchical metadata management system (HMMS), the method comprising:

storing each pointer of at least one pointer in a metadata object wherein said metadata object corresponds to an attribute being exhibited by a unique file to which each said pointer corresponds, each said pointer residing in a first repository, each said unique file residing in a second repository, each said metadata object residing in third repository, said storing being performed by said HMMS;

after said storing, deleting each said pointer from said first repository, said deleting being performed by said HMMS;

receiving from said first repository an event indicating both a unique file and a pointer corresponding to said unique file no longer resides in said first repository, said event being generated by said first repository in response to a request for said unique file, said event being received by said HMMS;

after said receiving, searching for said pointer in each said metadata object residing in said third repository, said searching being performed by said HMMS;

after said searching and having located said pointer in a metadata object residing in said third repository, restoring said pointer to said first repository, said restoring being performed by said HMMS; and after said restoring, notifying a hierarchical storage management system (HSM) that said pointer currently resides in said first repository thus allowing said HSM to retrieve said unique file corresponding to said pointer from said second repository.

17. The process for supporting computer infrastructure of claim 16, said storing and said deleting both being performed by said HMMS cyclically and independently of said receiving from said first repository said event.

18. The process for supporting computer infrastructure of claim 16, said storing and said deleting both being performed by said HMMS at least once before said receiving from said first repository said event.

19. The process for supporting computer infrastructure of claim 16, said storing and said deleting both being performed by said HMMS after a total number of pointers residing in said first repository exceeds a threshold, said threshold being established by an end user.

20. The process for supporting computer infrastructure of claim 16, said storing and said deleting both being performed by said HMMS in response to said HMMS receiving a request from an end user.

* * * * *